United States Patent
Kang et al.

(10) Patent No.: US 8,363,024 B2
(45) Date of Patent: Jan. 29, 2013

(54) HANDWRITING BOARD WITH LIQUID CRYSTAL DISPLAY FOR DISPLAYING HANDWRITTEN CONTENT ON A PROJECTOR

(75) Inventors: Shu-Hsuan Kang, San-Chung (TW); Fan Chang, San-Chung (TW); Ku-Ching Lu, San-Chung (TW)

(73) Assignee: Winmate Communication Inc., New Taipei (TW)

( * ) Notice: Subject to any disclaimer, the term of this patent is extended or adjusted under 35 U.S.C. 154(b) by 289 days.

(21) Appl. No.: 12/859,197

(22) Filed: Aug. 18, 2010

(65) Prior Publication Data
US 2012/0044152 A1   Feb. 23, 2012

(51) Int. Cl.
- G06F 3/041 (2006.01)
- G09G 3/36 (2006.01)
- G06K 11/06 (2006.01)
- G08C 21/00 (2006.01)

(52) U.S. Cl. .......... 345/173; 178/18.03; 345/87

(58) Field of Classification Search .......... 345/156–184; 178/18.03, 19.01–19.07
See application file for complete search history.

(56) References Cited

U.S. PATENT DOCUMENTS

| | | | | |
|---|---|---|---|---|
| 4,633,436 | A | * | 12/1986 | Flurry .......... 345/179 |
| 6,081,261 | A | * | 6/2000 | Wolff et al. .......... 345/179 |
| 2004/0085301 | A1 | * | 5/2004 | Furukawa et al. .......... 345/179 |
| 2008/0143757 | A1 | * | 6/2008 | Furihata et al. .......... 345/690 |
| 2009/0141186 | A1 | * | 6/2009 | Guo et al. .......... 348/739 |

OTHER PUBLICATIONS

S.J. Timmins, Tablet PC: blackboard to the web. ;In Proceedings of SIGUCCS. 2004, 296-300.*
Motion Computing M1400 Tablet PC User Guide, 2005.*

* cited by examiner

Primary Examiner — Dwayne Bost
Assistant Examiner — Larry Sternbane
(74) Attorney, Agent, or Firm — Chun-Ming Shih; HDLS IPR Services

(57) ABSTRACT

A handwriting board with a liquid crystal display (LCD) includes a wireless Universal Serial Bus (USB) unit, a USB hub unit, a USB/Video Graphic Array (VGA) conversion unit, a LCD driver unit, a LCD unit, a touch pad controller unit and a touch pad unit. When a user writes on the touch pad unit, the content written by the user is transmitted from the touch pad controller unit and the USB hub unit 204 to the wireless USB unit, which transmits the written content to a computer for processing. The processed written content is then transmitted to a projector and the wireless USB unit. Thereby, the written content can be displayed on the LCD unit.

8 Claims, 3 Drawing Sheets

HANDWRITING BOARD WITH LIQUID CRYSTAL DISPLAY FOR DISPLAYING HANDWRITTEN CONTENT ON A PROJECTOR

BACKGROUND OF THE INVENTION

1. Field of the Invention

The present invention relates to a handwriting board, in particular to a handwriting board with a liquid crystal display (LCD).

2. Description of Prior Art

FIG. 1 is a block diagram showing a conventional virtual electronic whiteboard. A user (not shown) holds a handwriting board 102 and writes thereon. Then, the content written by the user is transmitted in a wireless manner (by infrared or Bluetooth) to a computer 104. The computer 104 processes the written content and transmits the processed content to a projector 106. Finally, the projector 106 projects the written content onto a wall (not shown) for display.

Since the conventional handwriting board 102 is not provided with a display, the user cannot immediately recognize whether the written content is correct or not unless the user watches the content projected by the projector 106. Thus, such an arrangement is not user-friendly and is inconvenient for the user.

SUMMARY OF THE INVENTION

In order to solve the above-mentioned problems, an object of the present invention is to provide a handwriting board with a liquid crystal display.

The present invention provides a handwriting board with a LCD which includes: a wireless Universal Serial Bus (USB) unit, an USB hub unit electrically connected to the wireless USB unit, a USB/Video Graphic Array (VGA) conversion unit electrically connected to the USB hub unit, a LCD driver unit electrically connected to the USB/VGA conversion unit, a LCD unit electrically connected to the LCD driver unit, a touch pad controller unit electrically connected to the USB hub unit, and a touch pad unit electrically connected to the touch pad controller unit.

DETAILED DESCRIPTION OF THE INVENTION

The detailed description and technical contents of the present invention will become apparent with the following detailed description accompanied with related drawings. It is noteworthy to point out that the drawings are provided for the illustration purpose only, but not intended for limiting the scope of the present invention.

Figure 1:
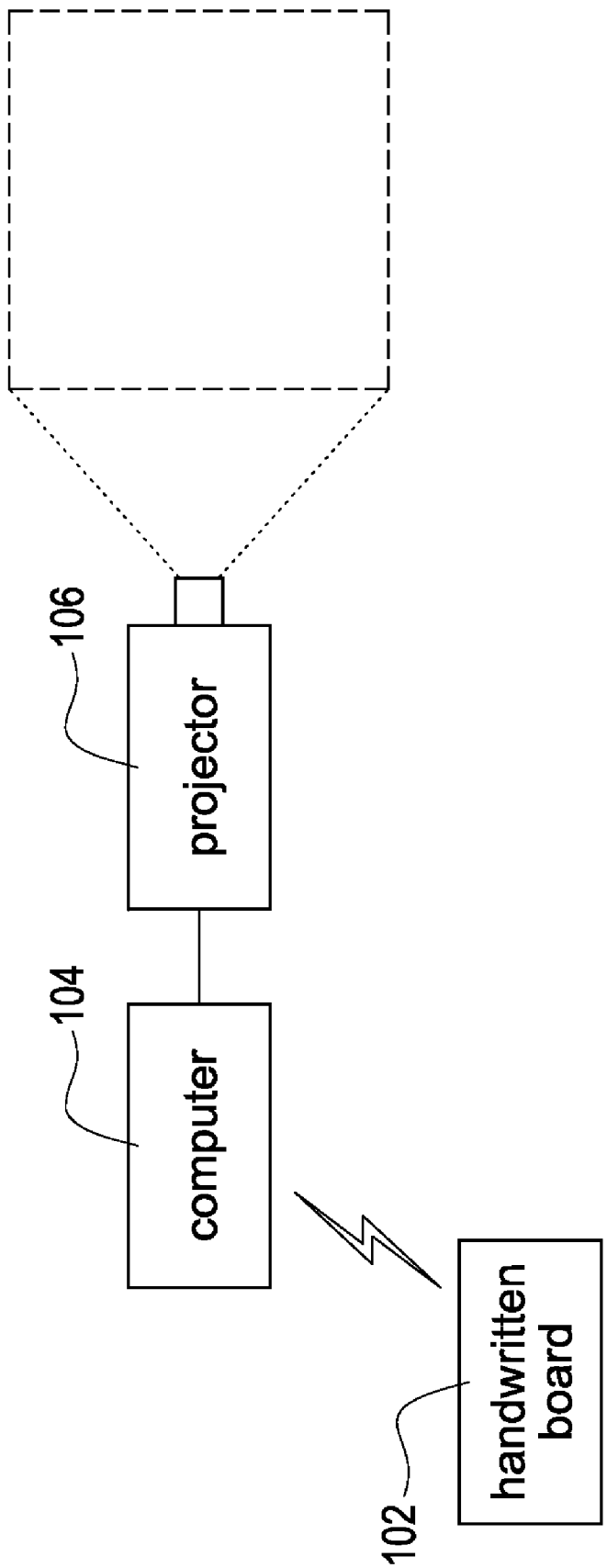
FIG. 1 is a block diagram of a conventional virtual electronic whiteboard.
Figure 2:
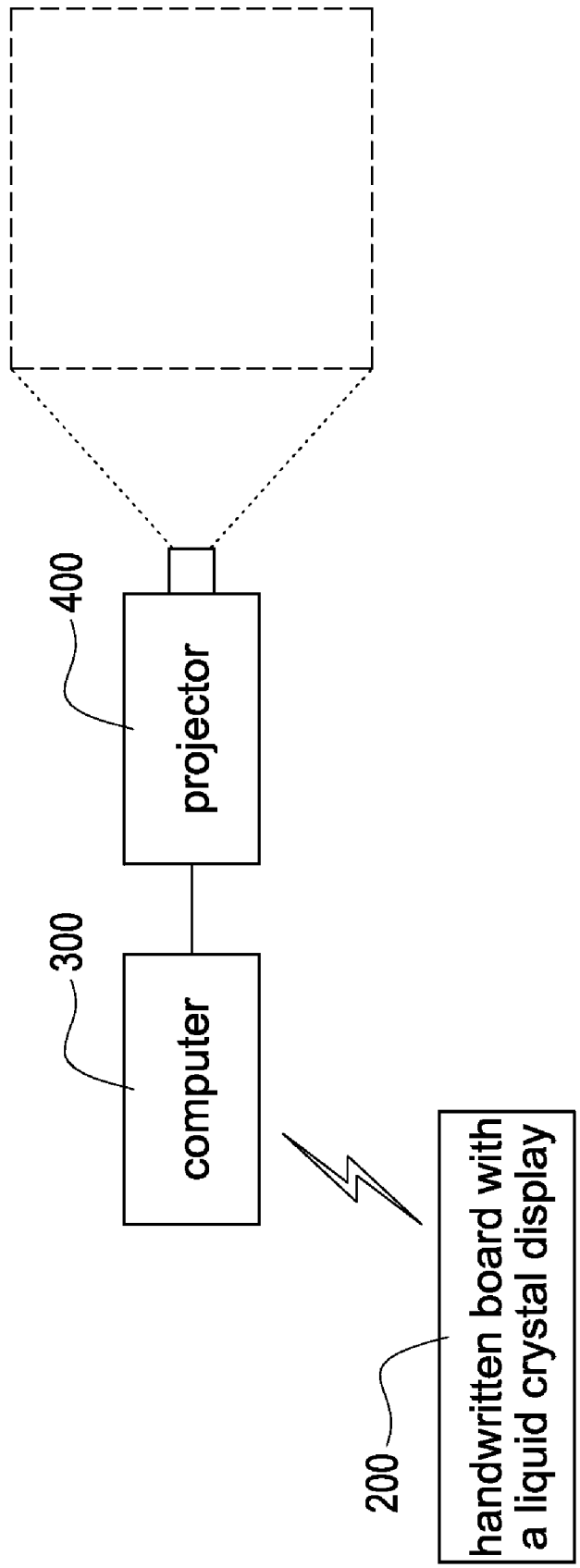
FIG. 2 is a block diagram showing the operation of a handwriting board with a LCD according to the present invention.
Figure 3:
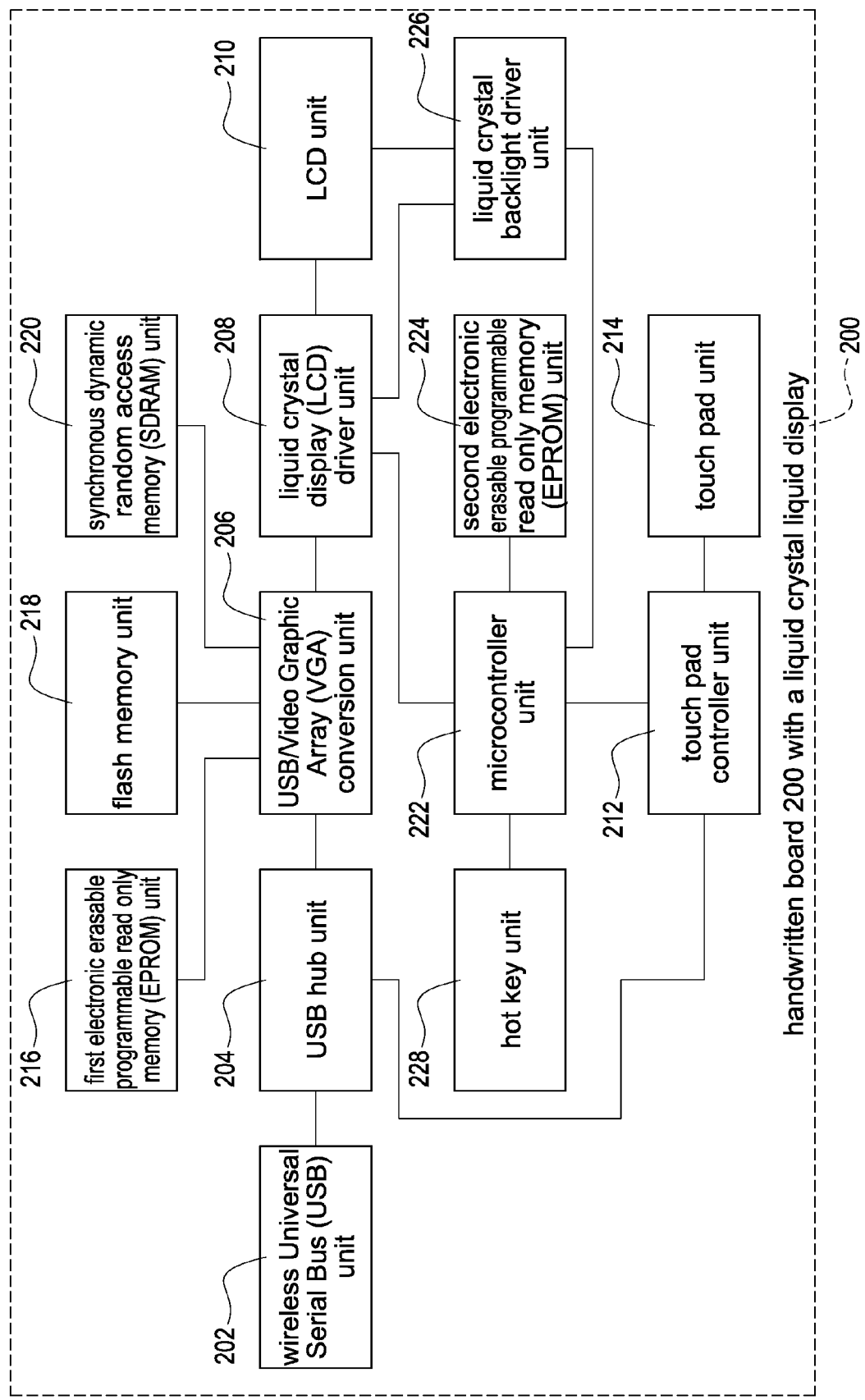
FIG. 3 is a block diagram of the handwriting board with a LCD according to the present invention.

Please refer to FIGS. 2 and 3. FIG. 2 is a block diagram showing the operation of a handwriting board with a LCD according to the present invention, and FIG. 3 is a block diagram of the handwriting board with a LCD according to the present invention. The present invention provides a handwriting board 200 with a LCD, which is used with a computer 300 and a projector 400. The computer 300 is electrically connected to the projector 400 and wirelessly connected to the handwriting board 200.

The handwriting board 200 with a LCD includes: a wireless Universal Serial Bus (USB) unit 202, a USB hub unit 204, a USB/Video Graphic Array (VGA) conversion unit 206, a LCD driver unit 208, a LCD unit 210, a touch pad controller unit 212, a touch pad unit 214, a first electronic erasable programmable read only memory (EPROM) unit 216, a flash memory unit 218, a synchronous dynamic random access memory (SDRAM) unit 220, a microcontroller unit 222, a second electronic erasable programmable read only memory (EPROM) unit 224, a liquid crystal backlight driver unit 226 and a hot key unit 228.

The USB/VGA conversion unit 206 is electrically connected to the USB hub unit 204, the first electronic EPROM unit 216, the flash memory unit 218, the SDRAM unit 220 and the LCD driver unit 208. The LCD driver unit 208 is electrically connected to the LCD unit 210, the liquid crystal backlight driver unit 226 and the microcontroller unit 222.

The second electronic EPROM unit 224 is electrically connected to the microcontroller unit 222. The touch pad controller unit 212 is electrically connected to the touch pad unit 214, the microcontroller unit 222 and the USB hub unit 204. The wireless USB unit 202 is electrically connected to the USB hub unit 204. The liquid crystal backlight driver unit 226 is electrically connected to the LCD unit 210 and the microcontroller unit 222. The hot key 228 is electrically connected to the microcontroller unit 222.

The SDRAM unit 220 may be a double-data-rata (DDR) SDRAM. The microcontroller 222 is configured to control the touch pad controller unit 212, the hot key unit 228, the liquid crystal backlight driver unit 226 and the LCD driver unit 208. The LCD unit 210 and the touch pad unit 214 can be integrated into a touch panel.

After a user (not shown) writes on the touch pad unit 214, the content written by the user is transmitted from the touch pad controller unit 212 and the USB hub unit 204 to the wireless USB unit 202. Then, the wireless USB unit 202 transmits the written content to the computer 300 in a wireless manner. The computer 300 processes the written content and then transmits the processed content to the projector 400, thereby projecting the written content on a wall (not shown). After the computer 300 processes the written content, the processed content is also transmitted back to the wireless USB unit 202 in a wireless manner. The wireless USB unit 202 receives the written content processed by the computer 300 and transmits the content to the USB hub unit 204, the USB/VGA unit 206 and the LCD driver unit 208. Finally, the written content is displayed on the LCD unit 210.

According to the present invention, the user can immediately watch the LCD of the handwritten board to recognize whether the content he/she writes is correct or not. Thus, it is unnecessary for the user to watch the content projected by the projector to recognize whether the content he/she writes is correct or not as needed in prior art. Therefore, the present invention increases the convenience of a virtual electronic whiteboard.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A handwriting board with liquid crystal display (LCD) for displaying a handwritten content on a projector, including:
- a wireless Universal Serial Bus (USB) unit;
- a USB hub unit electrically connected to the wireless USB unit;
- a USB/Video Graphic Array (VGA) conversion unit electrically connected to the USB hub unit;
- a LCD driver unit electrically connected to the USB/VGA conversion unit;
- a LCD unit electrically connected to the LCD driver unit;
- a touch pad controller unit electrically connected to the USB hub unit; and
- a touch pad unit electrically connected to the touch pad controller unit;
- wherein the handwritten content written on the touch pad unit is transmitted from the touch pad control unit and the USB hub to the wireless USB unit, and the wireless USB unit is configured to wirelessly transmit the handwritten content to a separate computer for processing, and the processed handwritten content is transmitted to the projector and, through the wireless USB unit, back to the handwriting board for display by the LCD unit.

2. The handwriting board with liquid crystal display according to claim 1, further including a first electronic erasable programmable read only memory (EPROM) unit electrically connected to the USB/VGA conversion unit.

3. The handwriting board with liquid crystal display according to claim 2, further including a flash memory unit electrically connected to the USB/VGA conversion unit.

4. The handwriting board with liquid crystal display according to claim 3, further including a synchronous dynamic random access memory (SDRAM) unit electrically connected to the USB/VGA conversion unit.

5. The handwriting board with liquid crystal display according to claim 4, wherein the SDRAM unit is a double-data-rate (DDR) SDRAM.

6. The handwriting board with liquid crystal display according to claim 4, further including a microcontroller electrically connected to the LCD driver unit and the touch pad controller unit, the microcontroller unit being configured to control the LCD driver unit and the touch pad controller unit.

7. The handwriting board with liquid crystal display according to claim 6, further including a second electronic erasable programmable read only memory (EPROM) unit electrically connected to the microcontroller unit.

8. The handwriting board with liquid crystal display according to claim 7, further including a liquid crystal backlight driver unit electrically connected to the LCD driver unit, the LCD unit and the microcontroller unit.

* * * * *